United States Patent
Crew et al.

(10) Patent No.: US 8,596,416 B2
(45) Date of Patent: Dec. 3, 2013

(54) TOOL CARRIER

(75) Inventors: Gregory Crew, Seattle, WA (US); John Haigh, Menomonee Falls, WI (US); Morgan Knickrehm, Tacoma, WA (US)

(73) Assignee: Safeworks, LLC, Tukwila, WA (US)

( * ) Notice: Subject to any disclaimer, the term of this patent is extended or adjusted under 35 U.S.C. 154(b) by 0 days.

(21) Appl. No.: 13/698,632

(22) PCT Filed: Jun. 15, 2012

(86) PCT No.: PCT/US2012/042809
§ 371 (c)(1),
(2), (4) Date: Nov. 16, 2012

(87) PCT Pub. No.: WO2012/174473
PCT Pub. Date: Dec. 20, 2012

(65) Prior Publication Data
US 2013/0153334 A1   Jun. 20, 2013

Related U.S. Application Data

(60) Provisional application No. 61/497,478, filed on Jun. 15, 2011.

(51) Int. Cl.
*E06C 7/12* (2006.01)
*E06C 7/16* (2006.01)

(52) U.S. Cl.
USPC ................... 182/103; 182/19; 182/8

(58) Field of Classification Search
USPC ............................... 182/8, 19, 103
See application file for complete search history.

(56) References Cited

U.S. PATENT DOCUMENTS

| | | | |
|---|---|---|---|
| 5,248,007 A | 9/1993 | Watkins et al. | |
| 6,330,931 B1 | 12/2001 | Baillargeon et al. | |
| 7,004,288 B2 * | 2/2006 | Araki et al. | 182/103 |
| 2002/0043426 A1 | 4/2002 | Bruneau et al. | |
| 2005/0178205 A1 * | 8/2005 | Nitsan | 73/597 |
| 2007/0158137 A1 * | 7/2007 | Petersen | 182/8 |
| 2009/0249712 A1 | 10/2009 | Brickell et al. | |
| 2011/0214940 A1 | 9/2011 | Matharu | |
| 2012/0178205 A1 * | 7/2012 | Chung | 438/72 |

FOREIGN PATENT DOCUMENTS

DE   102005044922   8/2010

OTHER PUBLICATIONS

"International Search Report and Written Opinion", PCT/US2012/042809, Sep. 6, 2012, 12 pages.

* cited by examiner

*Primary Examiner* — Alvin Chin Shue
(74) *Attorney, Agent, or Firm* — Woodcock Washburn LLP

(57) ABSTRACT

A system configured for lifting or lowering a tool carriage device via a ladder climbing structure is described. The tool carriage device may be adapted to enclose and transport a payload and include a fall arrest grab with an overspeed brake to stop an uncontrolled descent of the carriage device. The tool carriage device may include obstruction sensors to detect an obstruction along the path of the carriage device.

19 Claims, 22 Drawing Sheets

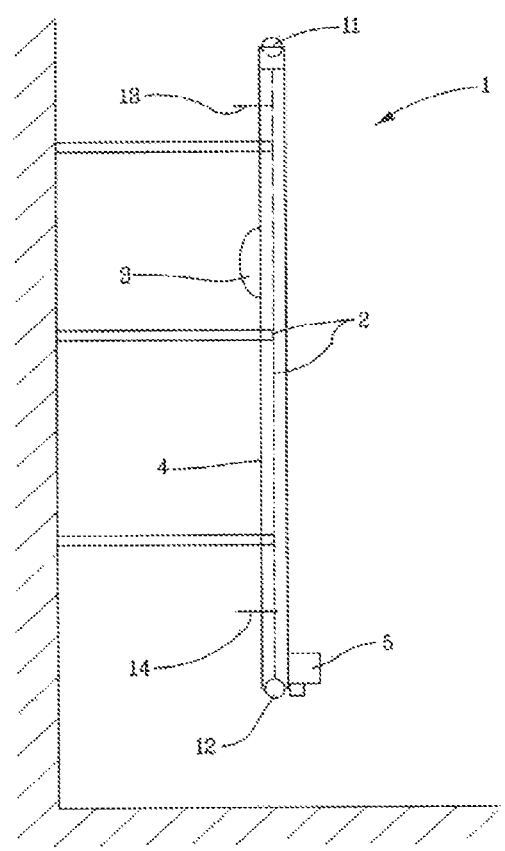

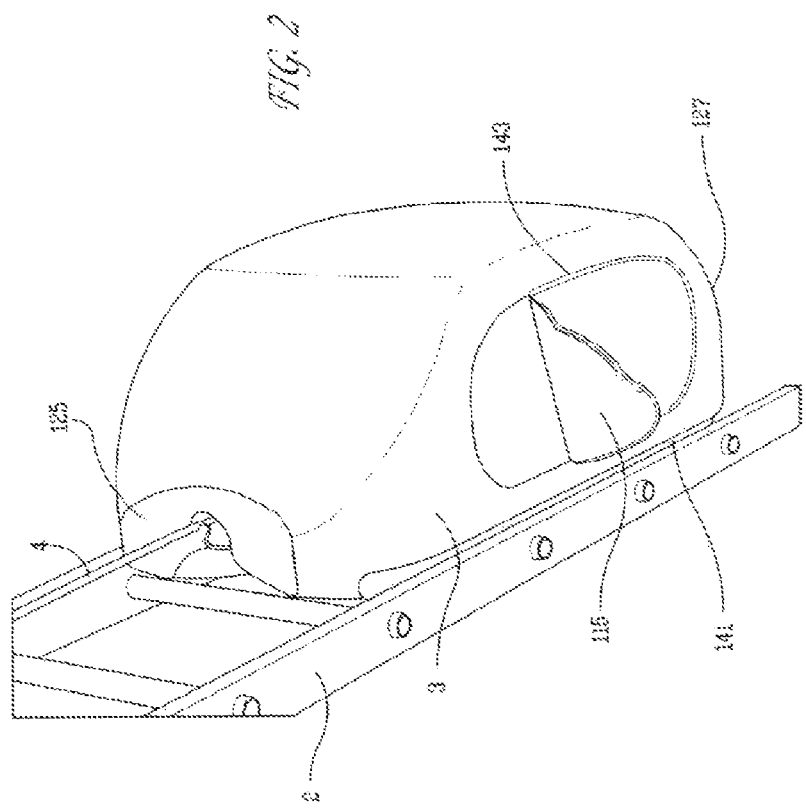

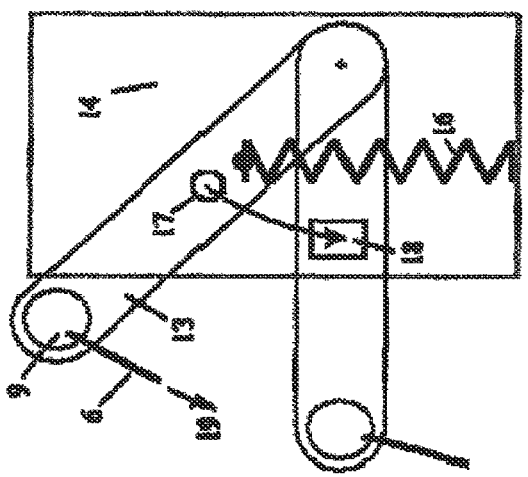
FIG. 14a Sensor
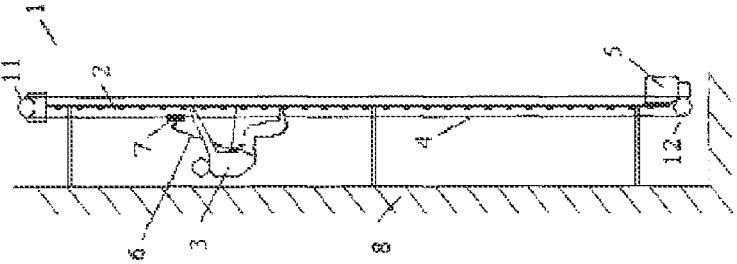
FIG. 13

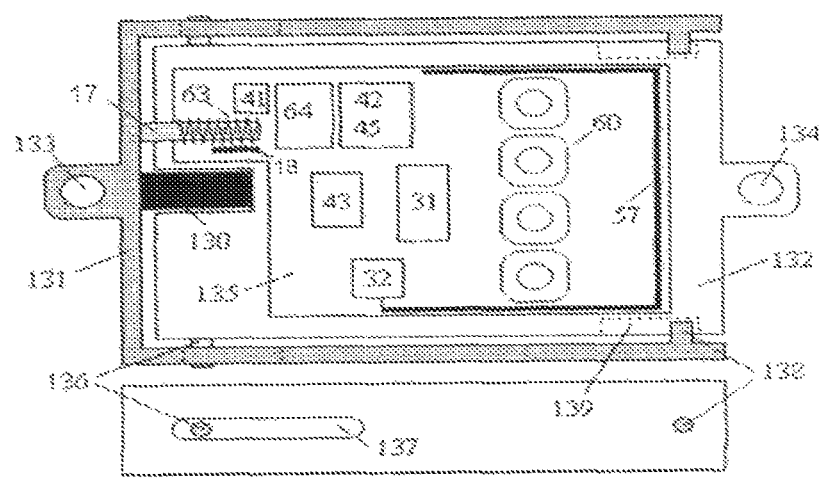
FIG. 14d Sensor
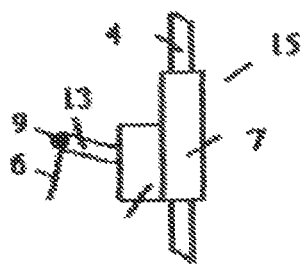
FIG. 14e Rope Grab-Sensor

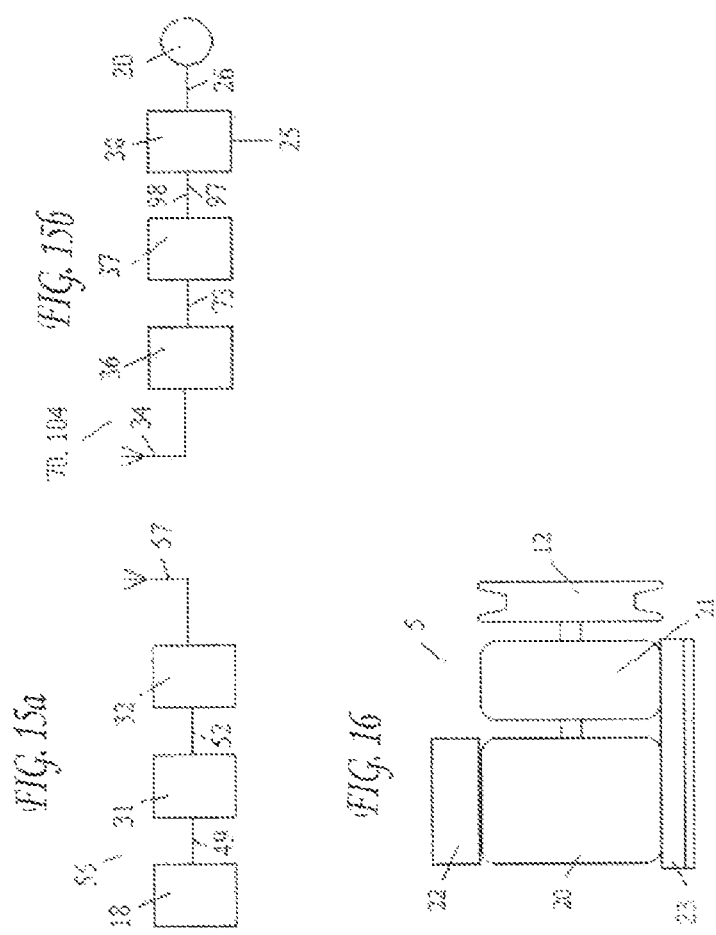

TOOL CARRIER

CROSS-REFERENCE TO RELATED APPLICATIONS

This application is the National Stage of International Application No. PCT/US2012/042809, filed Jun. 15, 2012, which claims the benefit of U.S. Provisional Patent Application No. 61/497,478, filed Jun. 15, 2011, the disclosure of which is incorporated herein by reference in its entirety.

A related application, now U.S. Pat. No. 8,141,681, filed on Nov. 26, 2008 and entitled "Tower Climbing Assist Device," provides further background for the disclosed embodiments and its contents are incorporated herein by reference in its entirety.

BACKGROUND OF THE INVENTION

Renewable energies such as solar energy are becoming an increasingly significant technology. Solar energy manifests in many different forms, one of which is wind energy that can be captured by wind turbines. Wind turbines employ blades or rotors that are aligned with the wind and turn when the wind passes over the blades. The turning blades in turn power a generator that effectively converts the potential energy of wind into electrical energy. Wind turbines commonly include a rotor having multiple blades that are mounted to a housing or nacelle that is positioned on top of a truss or tubular tower. In addition to the blade or rotor, a turbine also includes a drive train that typically includes a gearbox and a generator, a tower that supports the rotor and drive train, and other equipment including controls, electrical cables, and other interconnection and support equipment.

Because wind turbines have blades that rotate in the wind, there are many parts that move and require routine maintenance. Most maintenance is involve inspections of the turbine and the tower. To perform this maintenance, technicians must typically ascend the towers and perform inspections and maintenance tasks at various points along the tower including the top of the tower.

SUMMARY OF THE INVENTION

Climbers are concerned with safety and it is important that climbers have proper endurance and strength to safely ascend and descend long climbs. The arduous task of carrying a plurality of tools and materials can severely tax the strength of the climber, thereby exposing the climber to an increased chance of injury. In addition, the number of tools and materials might be more than one climber can carry on their person at one time, that requiring the climber to make multiple trips ascending and descending the turbine to retrieve the necessary tools and materials to complete a job.

Embodiments of the present invention may be particularly useful for assisting a climber when climbing a ladder, in particular when the climber's materials and tools must also be lifted. For example, ladders inside of wind generating towers may have heights of 50 feet to 350 feet or higher. Consequently, a climber may experience fatigue when climbing such a ladder while carrying tools and other materials. Embodiments of the tool carrier system described herein may provide assistance that reduces fatigue and enhances the safety of the climber by transporting the climber's tools and materials to various levels and up to the summit of such extensive climbs. The methods and systems disclosed herein may also be applied to many other fields of use including rock climbing, building escape or rescue methods, or any other application requiring vertical or near vertical transport of materials and tools.

One embodiment of a tool carrier system may be used in conjunction with a climb assist system to transport tools and materials from the bottom of the ladder to the top (yaw deck) or any intermediate platform, and back down.

An embodiment of the tool carrier system may contain a tool carriage device comprising a plastic or metal enclosure, on-board electronic sensors, a radio transmitter, and a user remote control. A tool carrier controller (TCC) may be used to control motion of the carrier itself.

BRIEF DESCRIPTION OF THE DRAWINGS

The foregoing summary, as well as the following detailed description of various embodiments, is better understood when read in conjunction with the appended drawings. For the purposes or illustration, there is shown in the drawings exemplary embodiments; however, the present disclosure is not limited to the specific methods and instrumentalities disclosed. In the drawings:

FIG. 1 shows a schematic side view of a tool carrier system.
FIG. 2 shows a perspective view of a carriage device.
FIG. 13 shows a schematic side view of a ladder climb assist device.
FIG. 15 a-b shows a diagrammatic representation of the major components of a climb assist system.
FIG. 16 shows a schematic diagram of a motorized drive system.

DETAILED DESCRIPTION OF ILLUSTRATIVE EMBODIMENTS

Figure 3A:
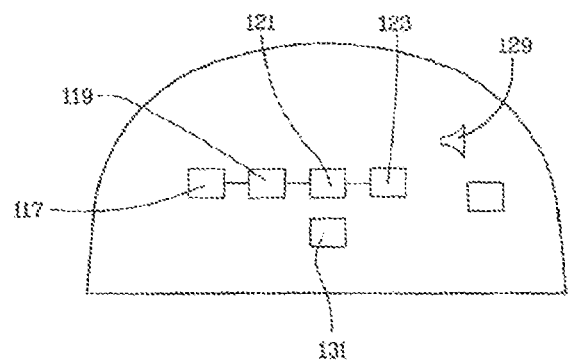
FIG. 3 [a-b] shows a schematic cross-sectional view of a carriage device.

FIG. 1 illustrates a schematic tool carrier system 1 including a side view of a carriage device 3 on a ladder 2 during ascent or descent on a tower. For example, the carriage device 3 may ascend the ladder during a maintenance routine of a wind generating tower. The carriage device 3 may be attached to a rigging 4, whereby the rigging 4 may be in the form of a continuous loop of material such as a reinforced polymer, flexible wire, or natural or synthetic rope with appropriate modifications or coatings to ensure efficacy in the application. The rigging 4 may extend between sheave 11 at a specified upper level of assist and sheave 12 at a specified lower level of assist. In one embodiment, the maximum weight of the contents contained within the carriage device is 100 lbs. Other limits may be specified. The disclosed system may also be useful for assisting a climber in ascending and descending other structures such as a signal tower, bridge, dam, and skyscraper.

In one embodiment the location of drive system 5 is at the lower level and provides drive to the lower level sheave 12. In other embodiments, alternative locations of the drive system may also be used.

Attachment to rigging 4 may be provided by an integrated belt grab 117 and an integrated attachment lanyard 131 that may be contained within the carriage device 3. In addition, carriage device 3 may be connected to a belt and fall arrest sensor 121. The belt and fall arrest sensor 121 may also be interconnected to a fall arrest grab with overspeed brake 119 (both are discussed below and shown in FIG. 3).

FIG. 1 also shows an optional upper stop plate 13 and an optional lower stop plate 14. In some embodiments, upper stop plate 13 and lower stop plate 14 may be positioned at any desired location along the ladder or climbing structure. The purpose of the stop plates is to stop the ascent or descent of carriage device 3 at a predetermined location. Carriage device 3 may contain an onboard upper obstruction sensor 125 and a lower obstruction sensor 127, shown in FIG. 2. The upper obstruction sensor 125 and lower obstruction sensor 127 may be configured to detect the location of the upper stop plate 13 and lower stop plate 14, respectively. Once the obstruction sensors detect the location of the stop plates, the obstruction sensors may depower the rigging, thereby halting the ascent or descent of the carriage device 3. In one embodiment the stop plate may be constructed of a rigid material, such as a metal or hard plastic. The obstruction sensors may be a proximity sensor or any suitable sensor to detect location, such as an optical sensor or magnetic sensor art. In other embodiments, other means can be used to trigger the stop of the ascent or descent, such as the technician's hand or the release of an appropriate control button. In some embodiments, the obstructions sensors may detect any obstructions along the path of movement by carriage device 3.

FIG. 2 shows a perspective view of carriage device 3 during ascent or descent on ladder 2 via rigging 4. In one embodiment, carriage device 3 may be constructed of a durable material such as plastic. Alternate embodiments of the carriage device 3 may be constructed of other durable materials, such as any metal or lightweight engineered compound.

In one embodiment, carriage device 3 may contain a groove 141 on the bottom portion (the side that touches the ladder or climbing structure) of the carriage device. Groove 141 may serve as a guide for the carriage device 3 so that it follows the path of the ladder or climbing structure. Groove 141 also provides lateral support for carriage device 3 so that it does not swing away from the ladder or climbing structure. Embodiments of carriage device 3 may provide additional lateral support in the form of a differently configured groove, such as a groove that wraps around the outside of the ladder or climbing structure. Other embodiments of carriage device 3 may utilize alternate means to keep the carriage device in contact with the ladder or climbing structure. For example, for nickel or iron-based climbing structures, carriage device 3 may include magnets located on or inside the carriage device 3 to retain contact with the ladder or climbing structure. In another embodiment, carriage device 3 may employ a system of wheels that lock onto to the ladder or climbing structure. Guides may be situated along the ladder to facilitate movement of the carriage device and/or its associated components. In some embodiments, the guides may be spring loaded to prevent obstruction of the carriage device during lifting or lowering of the carriage device.

In one embodiment carriage device 3 may contain a removable cover 115 located on an outer portion of carriage device 3. The purpose of the removable cover 115 is to allow for access to the contents stored in the interior portion of carriage device 3. In some embodiments the removable cover may be hinged or otherwise secured so as to prevent the cover from being dropped. Carriage device 3 may include an additional and optional internal bucket or container to carry smaller items.

In one embodiment, removable cover 115 may be attached to carriage device 3 via a means, such as a zipper 143, that runs along the perimeter of removable cover 115. The propose of zipper 143 is to keep removable cover 115 securely fastened to carriage device 3 while being easily disengaged to allow removable cover 115 to be detached. Alternate methods for attaching the removable cover 115 to the carriage device 3 may be used, such as buttons or a type of fastening tape, e.g., Velcro.

Removable cover 115 may also be configured so that a small portion of the removable cover 115 is permanently attached to carriage device 3. This may be accomplished by configuring the zipper such that it does not cover the entire perimeter of the removable cover. In this way, the removable cover will not drop when the cover is removed.

Other embodiments of carriage device 3 may include other means to expose the interior portion of carriage device 3, such as a hinged assembly. For example, the hinged assembly may be configured to allow an outer portion of carriage device 3 to swing open to allow access to the interior portion.

FIG. 2 also illustrates an upper obstruction sensor 125 and a lower obstruction sensor 127 as described above with respect to FIG. 1. In some embodiments upper obstruction sensor 125 and lower obstruction sensor 127 may comprise photo proximity sensors.

Figure 3B:
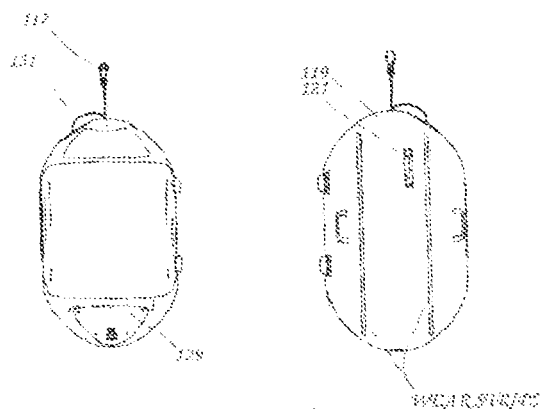

FIGS. 3a and 3b illustrate a cross-sectional view of carriage device 3 including integrated belt grab 117, integrated fall arrest grab with overspeed brake 119, belt and fall arrest sensor 121, a load cell 123, an audio sounder 129 and integrated attachment lanyard 131. Carriage device 3 may be interconnected to rigging 4 via integrated belt grab 117. An embodiment of the integrated belt grab 117 may be configured so that a climber can easily engage and disengage carriage device 3 from rigging 4 without the use of tools. In other embodiments, integrated belt grab 117 may be configured to require the use of tools or other instruments for engaging and disengaging carriage device 3 from rigging 5.

In one embodiment, the carriage device 3 may contain belt and fall arrest sensor 121 and integrated fall arrest grab with overspeed brake 119 to stop the carriage device 3 during an uncontrolled descent. Belt and fall arrest sensor 121 may sense uncontrolled descents. In one embodiment, belt and fall arrest sensor 12 may comprise an accelerometer. Integrated fall arrest grab with overspeed brake 119 may be configured with a variety of braking mechanisms. Integrated fall arrest grab with overspeed brake 119 may be configured to stop carriage device 3 in an uncontrolled descent either by braking against the ladder or climbing structure, or by braking against rigging 4.

In one embodiment, carriage device 3 may be equipped with load cell 123 that is configured to detect the weight of carriage device 3. For example, if the weight of carriage device 3 exceeds 100 lbsf, load cell 123 may disengage power to rigging 4, thereby not allowing carriage device 3 to continue its ascent or descent.

Carriage device 3 may include audio sounder 129. Audio sounder 129 may be configured to alert the technicians and other nearby personnel of the location and status of carriage device 3. Audio sounder 129 may emit a variety of audio sounds, such as intermittent or continuous beeps, to notify personnel that the carriage device 3 is ascending, descending, stopped, or in other states that are not described herein. For example, if removable cover 115 has become disengaged from carriage device 3, audio sounder 129 may emit a particular beep or noise to alert the personnel of the situation. In other embodiments, the audio sounder 129 may emit a variety of noises, such as music, a recorded voice message, or other audible sounds to alert personnel of the status of carriage device 3.

Carriage device 3 may include wear strips along the areas of the carriage device susceptible to contact with the ladder structure and other components that may result in wear and damage.

Carriage device 3 may also include an integrated attachment lanyard 131 that can optionally be attached to an overspeed sensing and protection device. Such a device may be configured to apply variable levels of friction or other means to slow down or stop the carriage device as a function of the detected speed of the carriage. For example, the device may be a progress capture device. Lanyard 131 can also provide mechanical advantage lifting of the carriage device. For example lanyard 131 may be attached to a pulley mechanism.

Figure 4:
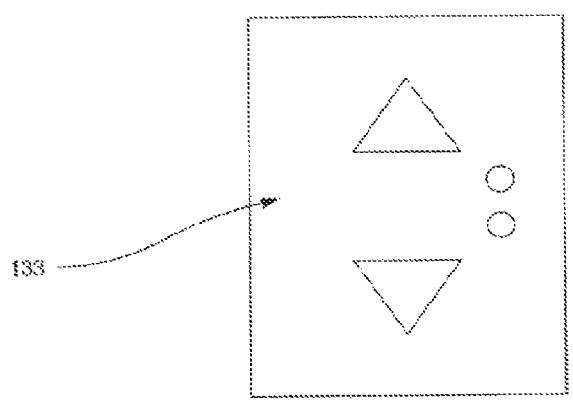
FIG. 4 shows a handheld wireless tool control pendant.

FIG. 4 illustrates a handheld wireless tool control pendant 133. Wireless tool control pendant 133 may be configured to control the ascent, descent, and stop positions of carriage device 3. In one embodiment, wireless control pendant 133 may include a plurality of control buttons, such as: UP, DOWN, and STOP. In some embodiments, handheld wireless tool control pendant 133 may contain an LED display that allows for control of carriage device 3. In sonic embodiments, the STOP button can be omitted and the UP and/or DOWN switch can be configured as a "dead man switch" (i.e., a switch that requires active engagement for activation).

In one embodiment, the LED display may include touchscreen technology that receives user inputs to allow control of the ascent and descent of carriage device 3. In some embodiments, the LED display may present various status indicators of carriage device 3. For example, the LED display may indicate the location or current motion (e.g. ascend, descend, or stop) of carriage device 3. The LED display may also display status indicators such as the predicted arrival time when carriage device 3 will arrive at its predetermined location. The LED may also indicate the speed of travel or weight of the carriage device.

In one embodiment the handheld wireless tool control pendant 133 may control carriage device 3 through a portable control box 137. Handheld wireless tool pendant 133 may communicate with the portable control box 137 via a wireless signal. In one embodiment, the wireless signal may be a radio frequency (RF) signal. In some embodiments, the wireless signal may be infrared light, laser light, visible light, acoustic light, etc.

In one embodiment, portable control box 137 may be directly mounted to the ladder or climbing structure. Portable control box 137 may contain a number of different switches, such as ON/OFF and RUN/INSPECT.

In one embodiment, the tool carrier system may be used with one person traveling to the top of the wind turbine, while a second person may remain at a lower elevation. The tool carrier system may then transported between the two personnel. Alternate embodiments may use configurations to allow the tool carrier system to be used by one service person working solo or more than two service persons.

Because technicians working on wind turbines may encounter a variety of circumstances, an embodiment of the tool carrier system may be designed to operate in several different modes, each according to the circumstances encountered. In a normal operation mode, the tool carrier system may travel from a starting point to an end point. The upper and lower stop plates may be used as one means of stopping carriage device 3 at some predetermined end point. Alternately, technicians may opt to not use one or both stop plates and instead manually control the ascent and descent of the carriage device via the handheld wireless tool control pendant 133 or portable control box 137.

In an auto-recovery mode, the tool carrier system may be configured to respond to temporary obstructions that may impede the path of carriage device 3. This mode may allow for prevention of damage to the tool carrier system and also alleviate unsafe conditions by not allowing carriage device 3 to continue traveling over or through temporary obstructions that may impede the path of carriage device 3.

In a manual recovery mode, the tool carrier system may be configured to allow technicians to manually recover carriage device 3 if it becomes immobilized for any reason. For example, carriage device 3 may become immobile due to motor failure. In this event, the manual recovery mode can allow technicians to manually ascend, descend, or stop the movement of carriage device 3. The manual recovery process may employ a variety of different methods, such as a service person ascending or descending the carriage device by hand. Alternately, the service person may connect the rigging to an external motor and power supply to raise or lower carriage device 3 if it is too heavy to be safely ascended or descended by hand. The manual recovery mode may employ a variety of recovery methods.

In addition, other embodiments may employ other modes to accommodate various situations, such as if one or more service person(s) becomes incapacitated or the tool carrier system experiences a power supply failure.

Figure 5:
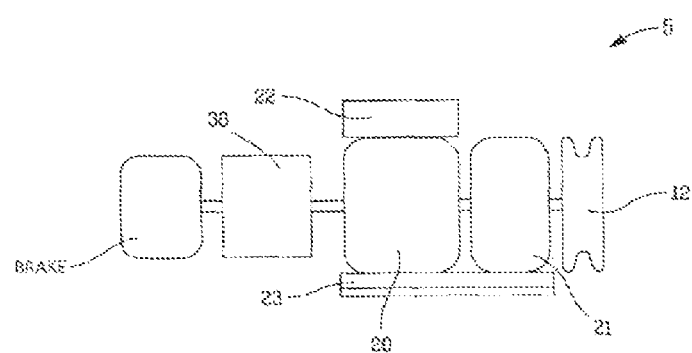
FIG. 5 shows a schematic diagram of an embodiment of a sender.
Figure 6:
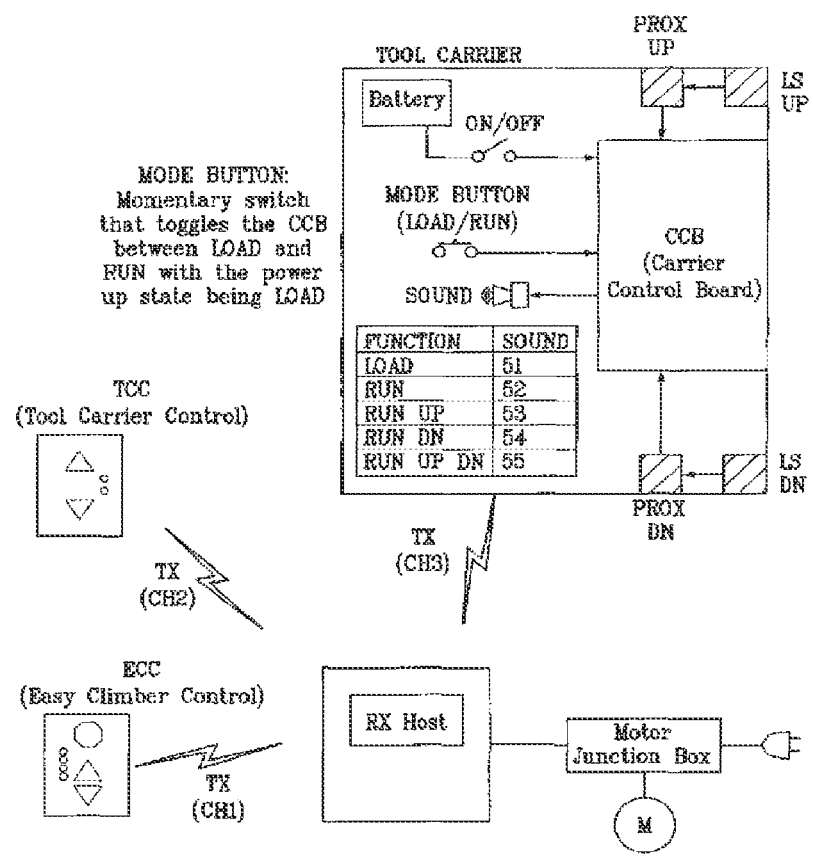
FIG. 6 illustrates one embodiment of the invention.
Figure 7:
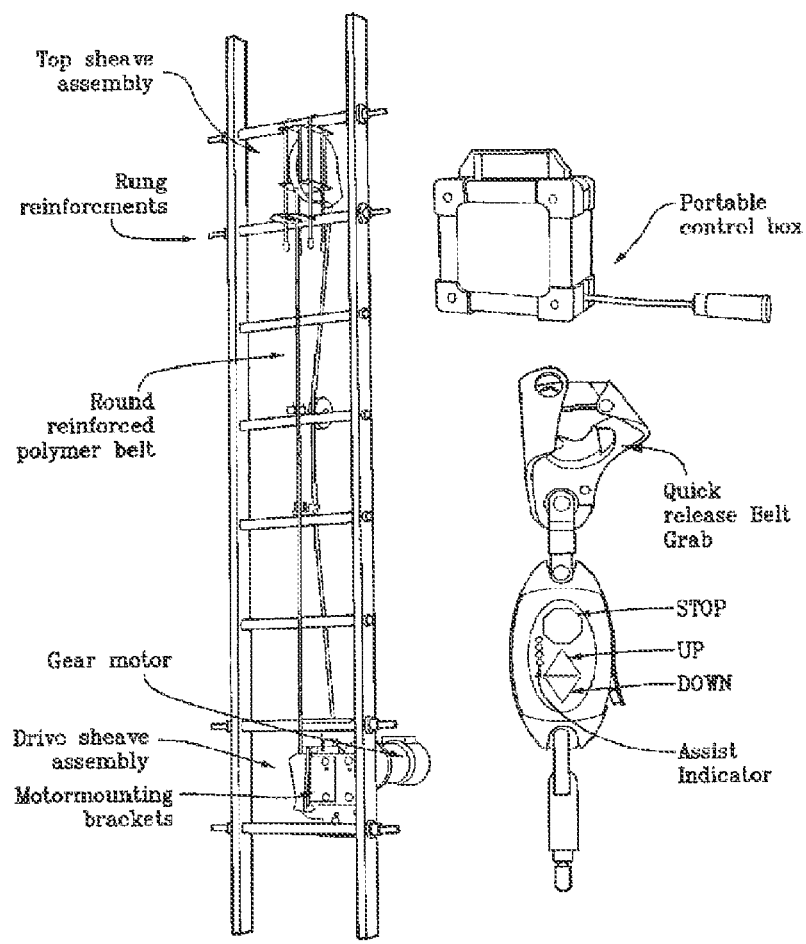
FIG. 7 illustrates one embodiment of the invention.
Figure 8:
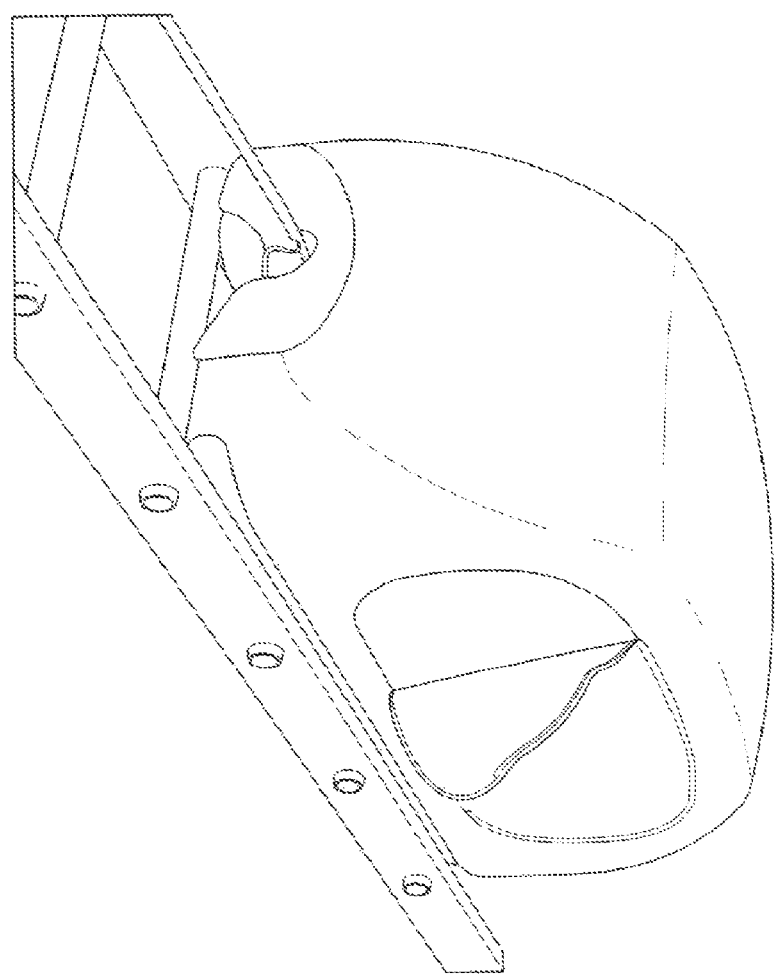
FIG. 8 illustrates one embodiment of the invention.
Figure 9:
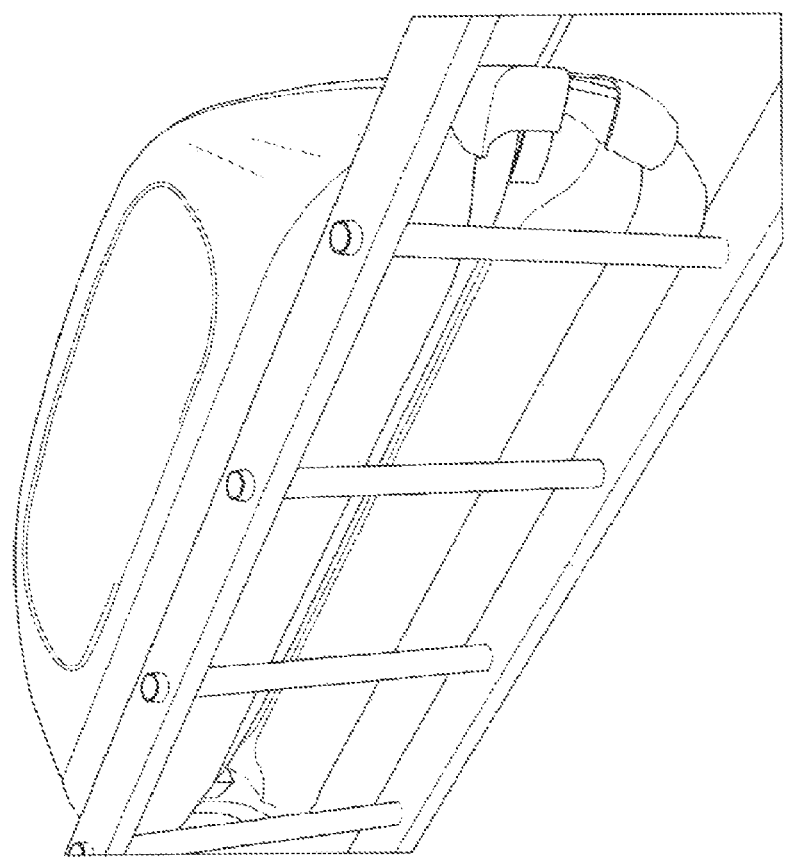
FIG. 9 illustrates one embodiment of the invention.
Figure 10:
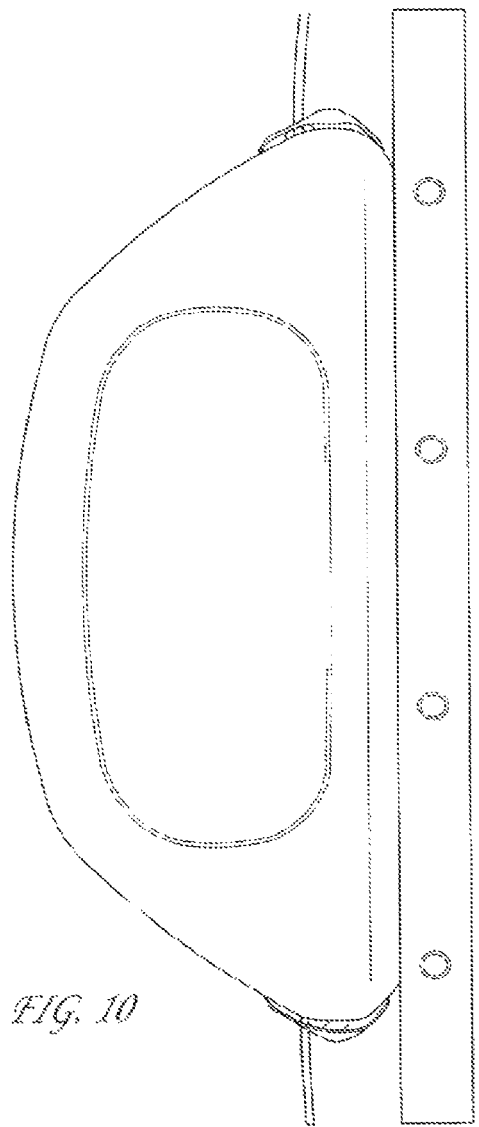
FIG. 10 illustrates one embodiment of the invention.
Figure 11:
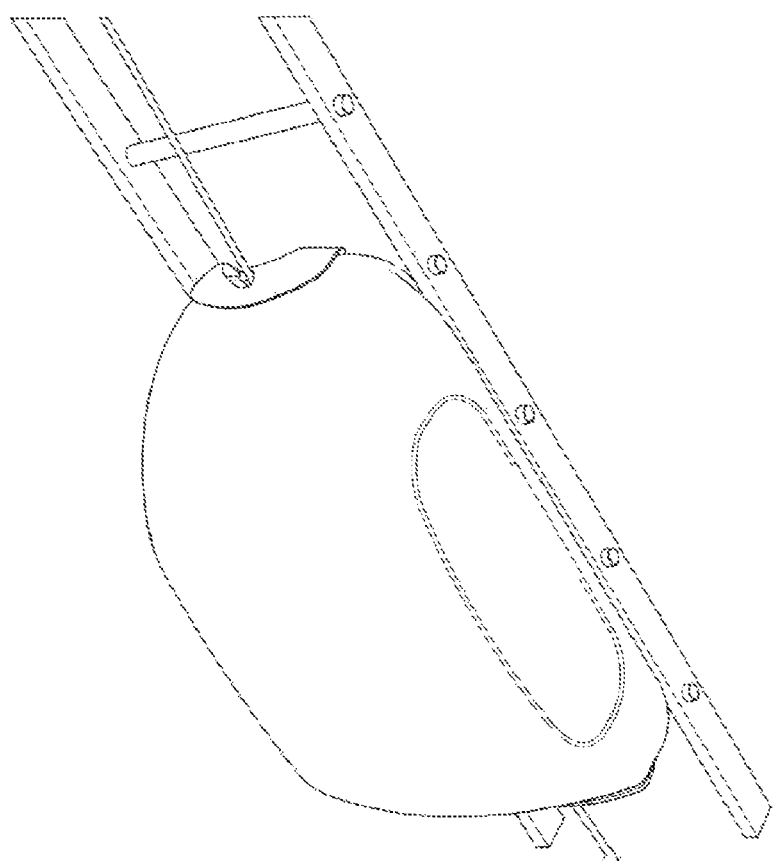
FIG. 11 illustrates one embodiment of the invention.
Figure 12:
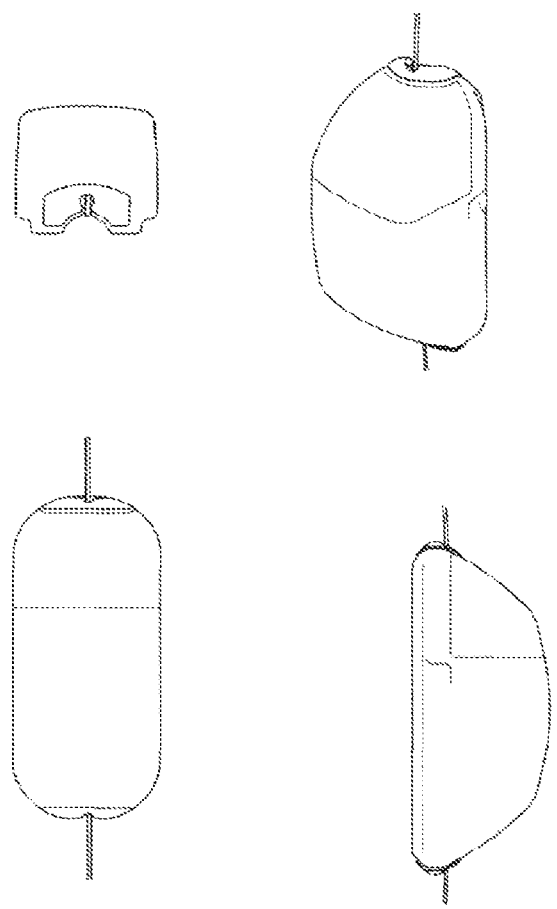
FIG. 12 illustrates one embodiment of the invention.

FIG. 5 illustrates a motorized drive system 5 comprising a motor 20, drive 38, sheave 12, supervisory system 22, mounting base 23, optional gearbox 21, and a brake. Preferably motor 20 and gearbox 21 are mounted on mounting base 23. The motor type may be selected from AC or DC, synchronous, non-synchronous, permanent magnet, brush or brushless, stepping and wound rotor and or stator types. Motor 20 in one embodiment may be a synchronous AC type, however other types of motors may be used including single and multiphase. The power delivered to motor 20 may be from drive 38 which may be selected from commercially available types including variable frequency (VF), pulse width modulated (PWM), phase controlled, voltage controlled or current limited types. To convert between the rotational speed of motor 20 and lower level sheave 12, gearbox 21 may by interposed. Gearbox 21 may be selected from worm drive, planetary, harmonic, or other types. These gearbox types each confer different attributes, and depending on the motor-drive selected, may be omitted, for example if the selected motor type is able to deliver the required torque without a gearbox and also provide the safe operation of the system under fault and emergency conditions. For convenience of description motor 20, gearbox 21 and sheave 12 are depicted as an in-line arrangement. However they may be positioned as required for mechanical convenience determined by the respective structure.

In one embodiment, an induction motor using a gearbox for speed reduction may be used, and optionally may include a brake to positively lock the system when the power supply to the motor is terminated. Where a worm drive is implemented, the brake may be omitted. Additionally, the drive system may also include a means of determining motor speed and direction of rotation.

Drive 38 provides transformation from the external power supply to the power characteristic required by motor 20 to drive sheave 12. In one embodiment, the power supply to the system is 115 Vac and the power used by the motor is of variable frequency from zero to 120 Hz and variable voltage between zero and 90 Vdc. Other external power supply values may be provided and other specified limits may additionally be imposed for motor control including current limit, overload sensing and overspend sensing. This allows control of both motor speed and torque to provide the assist characteristics required.

Additionally, supervisory system 22 may include a signal receiver to receive signals from a load sensor system. In one embodiment, the transmission method for the signal is wireless and may be unidirectional from sensor 30 to drive 38. Other implementations for transmission of the signal may be used such as wired, sound (ultrasonic), light (UV, visible or IR), induction (coupled via the assist rope if metallic), or other methods. Unidirectional transmission may be used for simplicity, but bidirectional including duplex transmission may also be used and may provide the capability communicating information from other sources, for example motor or drive conditions, communication link integrity, and ether advisory information.

When initiating transmission from the sender is received, motor 20 may ramp up over a period such as 1 second to provide an initial torque and speed to provide a limited assist (for example 50 lbs.) with a corresponding climb rate determined by the climber.

In one embodiment, both climb assist load support and speed of the rope loop may be limited in the control algorithm. In addition, sheave 12 may be coupled to the system by a slipping clutch to prevent excess climb assist load (for example, greater than 120 lbs) from being applied to the rope loop. In the event of a load being applied that exceeds the rated value for the clutch, sheave rotational speed can differ from the input drive to the clutch and thereby limit delivery of assist.

A maximum value of assist may also be set by selecting a motor with a specified maximum deliverable torque. Alternatively, current limiting in the drive may be employed to limit applied assist force.

In one embodiment, in order to terminate assist to the rope loop (for example when the climber wants to stop the system), the climber may sag back against the assist direction for a specified minimum time, thereby exerting a load greater than a specified maximum load. When the control algorithm senses a load that exceeds the specified maximum load for a specified time (for example 3 seconds), then assist may be removed from the rope loop and braking may be provided to limit further rotation. Optionally, the climber may operate a control on the sender to terminate assist.

In one embodiment of the tool carrier system, a technician at the point of origin at the base of a ladder or up-tower may attach the tool carriage device to a belt grab and to a static fall arrest system on the ladder. The technician may then load content into the carriage device and lock close the carriage device. The technician controlling movement of the carriage device may then use a TCC to engage the motor, move the belt, and send the carrier to the location of a second technician. The second technician may then unload the tool carrier and remove the tool carrier from the belt and ladderway.

An embodiment of the tool carriage device may operate in a "Tool Mode." When "Tool Mode" is activated, input from the controller used for "Personnel Mode" may be locked out.

In addition, an embodiment of the tool carriage device may include upper and tower integrated obstruction sensors that are configured to detect persons or other obstructions in the travel path of the tool carriage device and, if detected, to stop motion as necessary. An embodiment of the carriage device may also include an audio sounder to alert persons in the tower of the tool carrier's location and status. For example, different audio alerts can be used to identify the status of the carriage device (e.g., loading, motion, or obstruction). The sensors and signals may be configured to minimize or eliminate impact hazards to persons in the tower, or to prevent damage to the carrier or tower components due to impact during travel. The tool carriage device may operate in a number of modes that allow the tool carrier to be safely loaded and unloaded while on the belt and lock out any other communication from other climber control units that may be used for normal climb assist operation.

The foregoing description has set forth various embodiments of the apparatus and methods via the use of diagrams and examples. While the present disclosure has been described in connection with the embodiments of the various figures, it is to be understood that other similar embodiments may be used or modifications and additions may be made to the described embodiment for performing the same function of the present disclosure without deviating there from. Furthermore, it should be emphasized that a variety of applications, including rock climbing, building escape or rescue methods, or any other application requiring vertical or near vertical transport of a person are herein contemplated. Therefore, the present disclosure should not be limited to any single embodiment, but rather construed in breadth and scope in accordance with the appended claims. Additional features of this disclosure are set forth in the following claims.

The following are example embodiments of the present disclosure:

A system configure to lift or lower a carriage device via a ladder climbing structure, comprising:
  a rigging movable in a substantially vertical direction;
  a carriage device configured to enclose and transport a payload and adapted to be lifted and lowered along at least one rail of the ladder climbing structure;
  an apparatus coupled to the rigging adapted to translate rigging movement into an ascent or descent of the carriage device;
  a sensor operable to detect a change in state of the carriage device; and
  a control mechanism coupled to the power source and in electrical communication with the sensor to control power delivery to the rigging based on a detected change in state of the carriage device.

A carriage device configured to sense obstruction in its path and change state. A system configured to lift or lower a carriage device via a ladder climbing structure, comprising:
  a rigging, wherein the rigging is a reinforced belt and, movable in a substantially vertical direction;
  a carriage device, having upper, lower, outside, and inside portions, the carriage device configured to enclose and transport a payload, the carriage device adapted to be lifted and lowered along at least one rail of the ladder climbing structure, the carriage device comprising:
    a belt grab mounted to the carriage device and coupled to the rigging for ascent and descent;

a fall arrest sensor for detecting changes in the position of the carriage device;

a fall arrest grab with an overspeed brake electrically coupled to the fall arrest sensor and coupled to the rigging for braking the descant of the carriage device;

a load cell electrically connected to a control mechanism to detect the payload weight of the carriage device;

an upper obstruction sensor mounted to the upper portion of the carriage device and electrically connected to the control mechanism to detect a stop indicator;

a lower obstruction sensor mounted to the lower portion of the carriage device and electrically connected to the control mechanism to detect the stop indicator;

an audio sounder to alert persons of the carriage device's location and states;

an attachment lanyard; and an opening in at least outside portion having a removable cover to access the inside portion of the carriage device;

an apparatus coupled to the rigging adapted to translate rigging movement into an ascent or descent of the carriage device, including:

a motor for generating rotational torque;

power supply coupled to the motor;

a drive sheave assembly mechanically coupled to the motor;

a mounting apparatus coupled to the drive sheave assembly and motor and rigidly fixed to the ladder or climbing structure or other external anchoring device;

a sensor operable to detect a change in state of the carriage device; and a control mechanism coupled to the power source and in electrical communication with the sensor to control power delivery to the rigging based on a detected change in state of the carriage device.

A system configured to lift or lower loads via a ladder climbing structure, comprising:

a rigging movable in a substantially vertical direction;

an apparatus coupled to the rigging, said apparatus adapted to translate rigging movement into an ascent or descent of the load;

a sensor operable to detect a change in state of the load;

an input mechanism operable to receive a signal indicating whether the load is a person or a carriage device; and a control mechanism coupled to a power source and in electrical communication with the sensor to control power delivery to the rigging based on a detected change in state of the load and on said signal indicating whether the load is a person or a carriage device, the carriage device configured to be lifted and lowered along at least one rail of the ladder climbing structure.

As previously mentioned, U.S. Pat. No. 8,141,681, filed on Nov. 26, 2008 and entitled "Tower Climbing Assist Device," provides further background for the disclosed embodiments and describes details for providing lifting and lowering functionality that can be used in conjunction with embodiments of the tool carrier described above.

In one embodiment, a sensor for detecting the state of a climber is provided. Specifically, a sensor for detecting a load that a climber exerts on an assist rope is incorporated into the system in order to control the amount of power needed to assist the climber. Additionally, the system may also include a sender to transmit the load data to a receiver, a transmission path, a receiver to receive the data from the sender, a supervisory controller to interpret the received data and a controlled motor and drive to provide energy to the assist rope. This disclosure describes a one way wireless or open loop communication for system control, however full duplex communication is also possible where said receiver also transmits data to said sender for purposes which would include for example annunciation to the climber, bidirectional verification of integrity of the wireless link and message error correction. It is considered an adequate simplification to use open loop communications for this invention as described below. Of course sensors for detecting a change in a load of a person is only one example of determining the state of the climber. Alternative to, or in addition to, a sensor for detecting a change in load, sensors for detecting any other change in the state or a person may be employed. For example, changes in eye movement, body temperature, heart rate, or other physical data are also a good indicator of a climber's state and physical attributes.

FIG. 13 shows a schematic climb assist system 1 side view of a climber 3 on a ladder 2 during ascent or descent on a tower. For example, a service personnel climbing a ladder during a maintenance routine of a wind generating tower. Said climber is attached by a rope grab 7 to an assist rope 4 which is preferably in the form of a continuous loop of material such as flexible wire or natural or synthetic rope with appropriate modifications or coatings to ensure efficacy in the application, extending between sheave 11 at the specified upper level of assist and sheave 12 at the specified lower level of assist. The preferred range of assist to the climber is in the range of 50 lbsf and 120 lbsf. Other higher or lower limits may equally be specified. Of course, the disclosed system is also useful for assisting a climber in ascending and descending in other structures such as signal tower, bridges, dams, and skyscrapers.

In this embodiment the preferred location of the drive system 5 is at the lower level and provides drive to the lower level sheave 12. Of coarse, alternative location of the drive system may also be used.

Attachment to assist rope 4 is by a lanyard 6 connected between a commercially available body harness worn by the climber and rope grab 7. In addition, said climber should be connected to an appropriate fall arrest device which is not further discussed in this disclosure.

Aspects of this invention relate to dynamic adjustment of the rate of assist manifest as the speed of assist rope 4, and level of assist of the climber manifest as the support of the load the climber exerts on assist rope 4. Climber needs may change over the period of traverse of the ladder as the climber needs to climb slower or faster than assist rope speed, and the weight of the climber. Consequently, the disclosed system takes account of climber fitness, weight and desired climb speed.

FIG. 14e shows a load sensor system 15 incorporated with rope grab 7. Lever 13 moves relative to structure 14 as load is applied to attachment point 9 by lanyard 6 attached to the climber's harness. Consequently, the signal representative of load is generated and communicated as further detailed below.

FIG. 14a shows a schematic view of a sensor system 15 incorporated into structure 14. When a load is applied to said lever 13, for example at harness attach point 9, the spring 16 is compressed. Preferably, spring 16 is a wound wire compression spring but other types of spring systems may equally be applied for this purpose, including but not necessarily expansion or torsion types made of metal or other compressible materials and systems such rubber, elastic, hydraulic or pneumatic systems. As spring 16 compresses under increasing load, magnet 17 moves towards hall effect device (HED) 18 in the direction indicated by the arrow. The changing electrical signal from HED 18 may be measured as a representation of the applied load. Operation of HED 18 is well understood by those skilled in sensor design and methods and will not be further described. Of course, alternative to HEDS, other methods, such as employing a strain gauge as part of a load cell, may be implemented.

Alternative structures are contemplated to perform the stated functions, including but not exclusively selected from optical, alternative magnetic, strain, or resistive components. Also the neutral or zero external load position may be different from that disclosed in that the position of magnet 17 relative to said HED 18 may be towards or at the center, or disposed to the other side of HED 18 such that increasing load will cause magnet 17 to move away from HED 18. Then the relative direction of the electrical signal to movement of magnet 17 will change accordingly, but remains representative of the load applied.

Figure 14B:
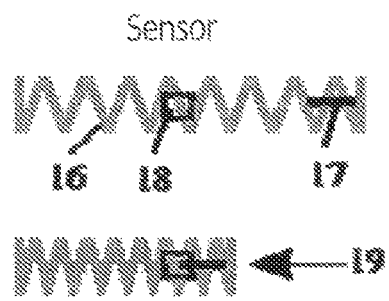
FIG. 14 a-e shows a diagrammatic embodiment of a rope load sensor device.

FIG. 14b shows another possible arrangement for sensing load. Again, as spring 16 compresses as the applied load increases, magnet 17 attached to spring 16 is disposed to move relative to HED 18, and as before, will generate an electrical signal in HED 18 representative of the load. Similarly, the alternative sensing methods discussed above also apply to this configuration of sensing.

The sensors disclosed in FIGS. 14a and 14b may be configured for attachment to either rope grab 7 or to lanyard 6. Either way the sensors will respond directly to the load imposed between climber 3 and assist rope 4.

Figure 14C:
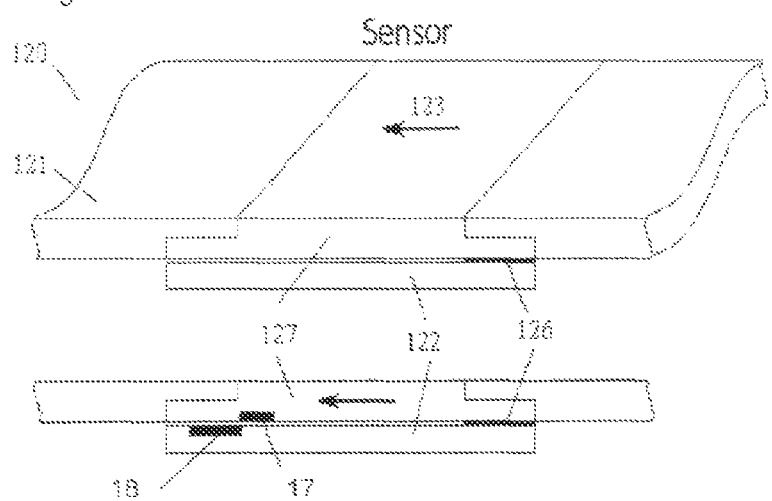

FIG. 14c shows yet another embodiment for a direct load sensing arrangement. In this embodiment the load reactive or stretchable material 127 is configured to be in series with lanyard 121 connected between the rope grab 7 and the body harness, and is directly responsive to the load imposed between climber 3 and assist rope 4. In the preferred embodiment, magnet 17 is embedded in stretchable material 127. One end of substrate 122 is fastened to lanyard 121 at 126 and carries HED 18. The end at 18 of substrate 122 is not constrained relative to lanyard 121. Positioning of HED 15 and magnet 17 is such that as load is applied, movement of magnet 17 relative to HED 18 generates an electrical signal as described above representative of the load. Of course, the positions of HED 18 and magnet 17 could be reversed, and additionally HED 18 and magnet 17 could both be placed on stretchable material 127.

To ensure that the electrical signal from HED 18 is not subject to erroneous interpretations as load changes, guiding systems may be incorporated in the structures to ensure that the relative position of magnet 17 to HED 18 is not subject to variation caused by orientation, vibration or other considerations. These are not specifically described as this is considered to be within the design capability of a skilled mechanical systems designer.

FIG. 14d shows yet another embodiment for a direct load sensing arrangement. In this embodiment the load reactive or stretchable material 130 is configured to attach between the outer shell 131 and the inner shell 132. Shells 131, 132 are constrained to move relative to each other in response to load being applied. In one application outer shell 131 may be attached to lanyard 6 at eye 133 and inner shell 132 attached to rope grab 7 at eye 134. Preferably, the attachment is by conventional means such as a carabiner. As shells 131, 132 displace relative to each other, stretchable material 130 provides a restoring force. Of course, an alternative arrangement where material 130 acts in compression may also be used.

Constraint of planarity and degree of available displacement between shells 131, 132 may be provided by pins 136, 138 moving within slots 137, 139 respectively.

Magnet 17 affixed to outer shell 131 alters its relative position to HED 18 affixed to inner shell 132 in response to load and as before provides a load responsive electrical signal. Additionally magnet 17 moves relative to coil 63 affixed to inner shell 132 and, consequently, is able to generate electrical current by well-known principles of Faraday's Law of Electromagnetic Induction. The electrical current may be applied to a rectifier 64 and charging circuit 42 to augment energy storage as disclosed below.

In the event the climber wants to terminate assist, either the load on sensor 30 may be increased so as to extend inner shell 132 to the maximum extent relative to outer shell 131 and activate a switch (not shown), for example by pin 138 operating the switch and immediately transmitting a stop message.

As a likely configuration in any of the above-described load sensing arrangements, the electronic components further described below may be disposed on a printed circuit board, for example 135. In addition, operable controls 60 may be included to allow direct selection of modes or assist. For example, said operable controls may be press buttons to select from a menu of speeds, load support, time responsiveness or other parameters which may be determined as desirable. Such selections then being communicated to said motor and drive to provide selected level of said assist.

FIG. 15a and FIG. 15b show a diagrammatic representation of the major components for control of climb assist system 1. FIG. 15a shows a diagrammatic representation of a sender and FIG. 15b shows a diagrammatic representation of a receiver.

To directly sense the load imposed by climber 3 on assist rope 4, sensor 30 as described above incorporated with sender 55 generates an electrical signal representative of load which is applied to a microprocessor 31 on line 49. Microprocessor 31 sends a signal on line 52 to transmitter 32 and thence is transmitted from antenna 57 to antenna 34 at the supervisory system 22 of FIG. 16. The received signal is converted by receiver 36 in said supervisory system from antenna 34 and passed to microprocessor 37 for conversion to control actions based on specified received signals and control algorithms. Drive 38 converts power from main power supply line 25 to a form determined by microprocessor algorithms to determine activity of motor 20.

FIG. 16 shows said motorized drive system 5 comprising a router 20, drive 38 and supervisory system 22 and optional gearbox 21. Preferably motor 20 and gearbox 21 are mounted on a base 23. The motor type may be selected from ac or dc, synchronous, non-synchronous, permanent magnet, brush or brushless, stepping and wound rotor and or stator types, as are well known. Motor 20 in this preferred embodiment is a synchronous ac type, however other types of motors will fulfill the requirements of this invention including single and multi-phase. The power delivered to motor 20 is from drive 38 which may be selected from commercially available types including variable frequency (VF), pulse width modulated (PWM), phase-controlled, voltage controlled or current limited types. To convert between the rotational speed of motor 20 and lower level sheave 12, gearbox 21 may by interposed. Gearbox 21 may be selected from worm drive, planetary, harmonic, or other well known types. These gearbox types each confer different attributes, and depending on the motor-drive selected, may be omitted, for example if the selected motor type is able to deliver the required torque without a gearbox and also provide for safe operation of the system under fault and emergency conditions. For convenience of description motor 20, gearbox 21 and sheave 12 are depicted as an in-line arrangement, however they may be positioned as repaired for mechanical convenience dote mined by respective structure.

While motor choice is not critical to the operation of the climb assist system, in one embodiment an induction motor using a gearbox for speed reduction is understood to be used, and optionally may include a brake to positively lock the system when power supply to the motor is terminated. Where a worm drive is implemented, as is well known from the high friction of reverse drive, the brake may be omitted. Additionally, it is understood that the drive system may also include a means of determining motor speed and direction of rotation as is well known to those skilled in motor and drive system design.

Drive 38 provides transformation from the external power supply to the power characteristic required by motor 20 to drive sheave 12. In this embodiment of the invention, the power supply to the system is 230 Vac and the power required by the motor is of variable frequency from zero to 120 Hz and voltage variable between zero and 230 Vac. Other external power supply values may be provided and other specified limits may additionally be imposed for motor control including current limit, overload sensing and overspeed sensing. This allows control of both motor speed and torque to provide the assist characteristics required.

Additionally, supervisory system 22 includes a signal receiver to receive signals from load sensor system exemplified by 30. In this preferred embodiment, the transmission method for the signal is wireless and is unidirectional from sensor 30 to drive 38. Of course, other implementations for transmission of the signal may be used such as wired, sound (ultrasonic), light (UV, visible or IR), induction (coupled via the assist rope if metallic), or other available methods. The nature of transmission of the signal will not be further considered in this invention and is considered well known to those skilled in the art. Also unidirectional transmission is specified for simplicity, but bidirectional including duplex transmission is also feasible and may offer the capability of communicating information from other sources, for example but not necessarily motor or drive conditions, communication link integrity and other advisory information.

Figure 17:
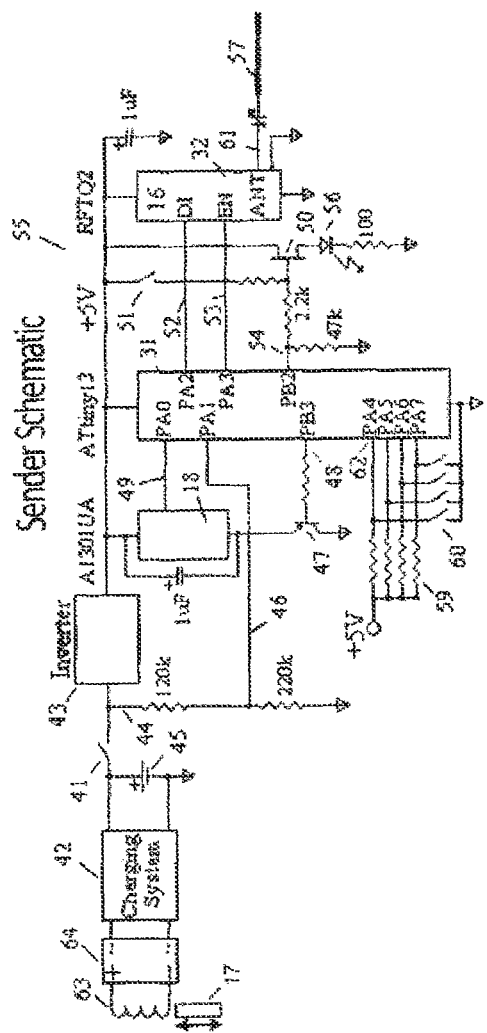
FIG. 17 shows a schematic diagram of an embodiment of a sender.

FIG. 17 shows the schematic of a preferred embodiment of sender of FIG. 15*a*. The load sensor of FIG. 14, further described with reference to FIG. 17, comprises HED 18 responsive to magnet 17. The characteristics of HED 18 is such that it is responsive to the incident magnetic field with an output voltage approximating 2 mV per Gauss over a range of field strengths. The analog output voltage from HED 18 is applied to the analog to digital converter input of the microprocessor 31 on line 49.

Figure 20:
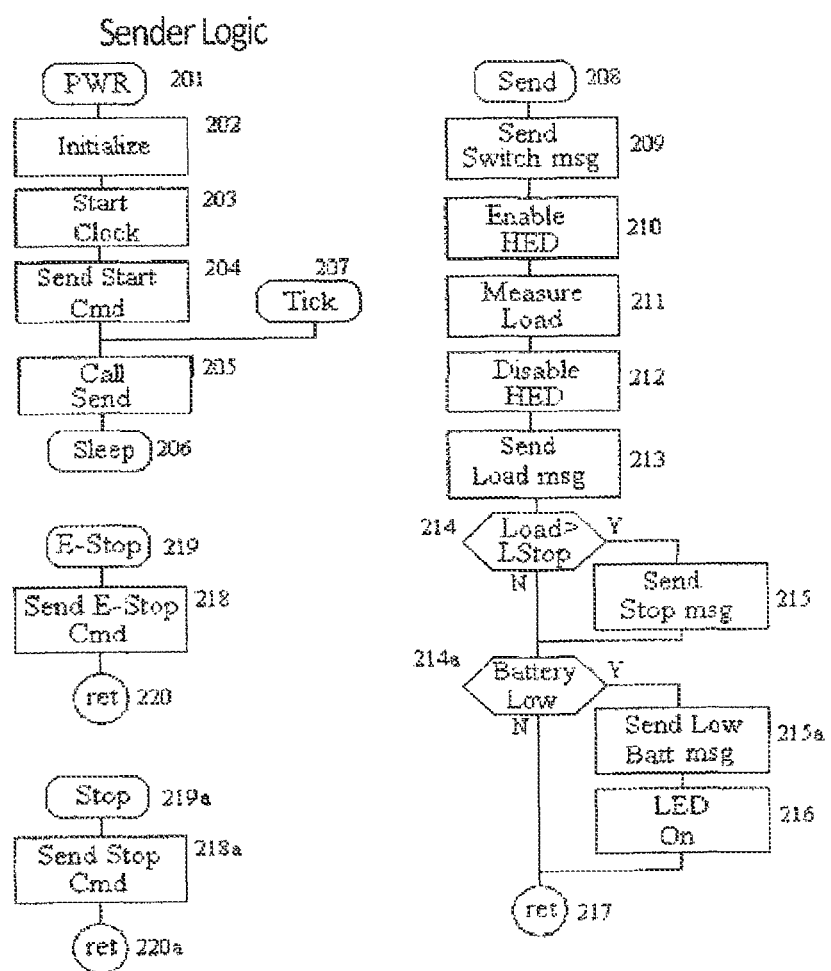
FIG. 20 is a flowchart illustrating an embodiment of a sender algorithm.

A software algorithm of FIG. 20 executes on microprocessor 31 and transforms the analog voltage on line 49 to a digital pattern which is transferred to transmitter 32 on line 52 for transmission to a remote supervisory system that controls the climb assist response to sensed load. Alternatively, microprocessor 31 could be omitted and the signal on line 49 could be directly applied to a suitable transmitter, for transmission as an analog signal without digitization. The benefit of incorporating the microprocessor is to more reliably determine the characteristics of the transmitted signal, and to incorporate other information about the system.

To extend the available duration of operational time for the sensor, it is desirable to minimize the power consumption of the sensor. Several mechanisms may be employed in the sensor to achieve acceptably low average power consumption, for example to turn on HED 18 and transmitter 32 only when data is to be collected and transmitted, and to transmit data packets at a sufficiently high bit rate. When line 48 is set low to turn on PNP transistor 47, power is applied to HED 18. Also, microprocessor software may be configured to only turn on transmitter 32 when a signal is required to be transmitted and then turn it off upon completion of the transmission. To achieve this, transmitter 32 has an enable input which will turn it on to the higher power transmit state from the very low power consumption sleep state. When microprocessor 31 sets line 53 to the enable state, it turns on the transmitter. The signal for transmission is then applied on hue 52. Upon completion of the transmission radiated via line 61 and antenna 57, line 53 may then be set to the not-enable state, then transmitter 32 enters a low power state and power consumption is reduced.

In addition, to further reduce power when no information is to be measured or transferred, microprocessor 31 may be set to various modes, one of which is where only restricted internal clock is operating. Consequently, the power consumption of the microprocessor may be reduced to a minimum value until the internal clock times out whereupon the software algorithm may be configured to; power HED 18 and transmitter 32, transmit the measured data, then resume the low power state with HED 18 and transmitter 32 in the off state and microprocessor 31 in the restricted clock state until the next clock timeout. The load sampling interval between measurement and transmission phases may be set from nominally zero, to any desired value. In this implementation of load sampling, the interval is between 0.1 and 10 seconds, with a preferred interval of 0.2 second. Note that the shorter the interval, the higher the average power consumption and the shorter the required time between energy storage device recharge cycles, or battery replacement. The load sampling interval may be varied dynamically throughout the period of climb to accommodate rapid setting of significant changes in the speed or torque required to provide effective climb assist, for example during initiation of climb assist.

Additional facilities may be provided in the sender for information display and operator signaling. Line 54 from microprocessor 31 may be set according the software algorithm to either input or output status. In this implementation line 54 is normally set as an input. If the operator doses switch 51, line 54 goes high and said microprocessor may be configured to respond to the change in signal level and wake up if in the restricted clock mode, otherwise it is awake. With said microprocessor configured to recognize transitions on line 54 as an interrupt, it will immediately respond to the change and through the software algorithm cause a signal to be transmitted, for example to effect an immediate stop of the assist motor providing an emergency stop function. When switch 51 is closed, LED 56 is illuminated via PET 50 to show the immediate stop state.

Also, if line 54 from the microprocessor is set high through the software algorithm, then LED 56 will be set high via FET 50. This may be used to signal whether the software algorithm is appropriately programmed to recognize specified conditions of interest to the operator, for example low battery or energy storage device voltage. Of course alternatives to, or in addition to, LED 56 may be implemented, for example a sounder device to attract the operator's attention. Signaling, via LED 56 may be coded to represent different conditions, for example LED 56 may be pulsed at a rate or on to off ratio to distinguish conditions such as low energy storage device voltage, failure of the HED, excess load, etc. Alternatively multiple indicators may be included.

Also shown are additional inputs 62 from switches 60. These switches may be used to set various modes of operation, for example assist speed, load or to set time delays of rates of change in application of assist.

Note that alternative assignments of functions are possible with any suitable microprocessor. This embodiment demonstrates one or many arrangements that anyone skilled in microprocessor systems may conceive.

While sensor 30 implements unidirectional transmission, bi-directional communications are also possible where the sender is capable of receiving signals as well as sending signals. The reason for using a bi-directional system, for example, may be to quickly ensure integrity of communications or send alerts or information to the climber. However, this is not considered to be an advantage in this implementation of the assist system because of the facilities provided in the assist system, for example, for the supervisory system to turn off the assist system capability if signals are not received from the sensor within a specified time, for example, but not necessarily within 3 seconds of the last transmission from the sender. If the sender transmits a signal 5 times per second, then a 3 second wait period would provide an indication that the communications path had failed and the drive system could enter a safe state until communications resume. Also it is likely that where the sensor includes bidirectional communication, then average power drawn from the energy storage device may increase, potentially reducing the duration between recharge cycles to the detriment of usability, and may also increase the cost of the assist system.

In a preferred embodiment, the power supply comprises an energy storage device 45, for example a rechargeable battery and a voltage converting inverter 43 to provide the desired operating voltage for operation of the system from a range of voltages of said energy storage device.

The sender 55 is turned on when, for example, the load responsive magnet 17 moves into range of a switch 41. For example, a reed switch placed in proximity of magnet 17 connects the energy storage device 45 to inverter 43 to provide the required voltage, for example 5V, to the sender. Other means may be provided for powering the transmitter, and preferably the power is applied only when the assist system is required to operate. As another alternative, the switch could be a mechanical switch manually operated, or mechanically coupled to respond to attachment and movement of the sensor as previously disclosed.

With reference to FIG. 17, the sensor is preferably supplied by an integral energy storage device, for example a rechargeable battery. Optional charging systems 42 may be provided depending on the type of said energy storage means for example selected from types such as:

Alkaline & Zinc-Carbon with 1.52V per cell (not rechargeable)
Mercury with 1.35V per cell (not rechargeable)
Silver Zinc with 1.86V per cell (not rechargeable)
Nickel Metal Hydride with 1.2V per cell (electrically rechargeable)
Nickel Cadmium with 1.2V per cell (electrically rechargeable)
Lithium Ion with 3.6V per cell (electrically rechargeable)
Supercapacitor (electrically rechargeable)
Fuel cell (chemically rechargeable)

This is an example list and other types of energy storage means may be available. Each energy storage means has a specified discharge characteristic where the decrease in voltage output over time has a particular characteristic. Note that a single cell is depicted, however multiple cells may also be specified to bring the total voltage to the operating level required and thereby eliminate the need for said inverter.

Either a non-rechargeable energy storage device for example a zinc carbon cell may be used which would require periodic replacements, or where a rechargeable battery is used, the function of the charging system is to recharge the battery to ensure adequate energy for operation whenever needed. Many known possible charging systems are available, some of which may be selected from:

inductive energy transfer where the sensor is stored in proximity to a coil carrying alternating current to induce energy into a power receiver coil in the sensor when not in use, or;
direct connection from an energy source to the energy storage device, or;
ambient energy scavenging using piezo-electric generation from ambient vibration, thermoelectric effects, photoelectric generators, stray electric fields, etc to provide the energy input, or;
as depicted in FIG. 14d using the Faraday's Law of Electromagnetic Induction, and exampled in FIG. 17 with reference to 17, 63, 64 and 42 where movement of magnet 17 relative to coil 63 generates charge, rectified by 64 and applied as a charging current to energy storage device 45 via charging system 42, as is known to those skilled in electronic systems.

The function of inverter 43 is to transform the battery voltage, for example 1.2V to the required operating voltage for the sensor components, for example 5V. A well known method to transform the voltage is to use a boost switching capacitor regulator or boost switching regulator such as are manufactured by many semiconductor manufacturers, for example the National Semiconductor Corporation.

In the example of the sender described herein, the preferred voltage is 5V.

To provide information about the condition of energy storage device the voltage at line 44 may be sampled and applied to the analog to digital converter input of the microprocessor 31 on line 46. By this means, the sensor may transmit additional information about power supply status to the supervisory system.

As a further alternative to the use of energy storage device 45, commercially available energy harvesting devices may be employed where a transmitter such as that available from http://www.adhocelectronics.net/download/EnOccan/PTM230_Datasheet.pdf may be used. In this case the energy harvested from the environment is that from an electro-dynamic power generator resulting from movement, changed pressure or temperature, or other physical events.

Figure 18:
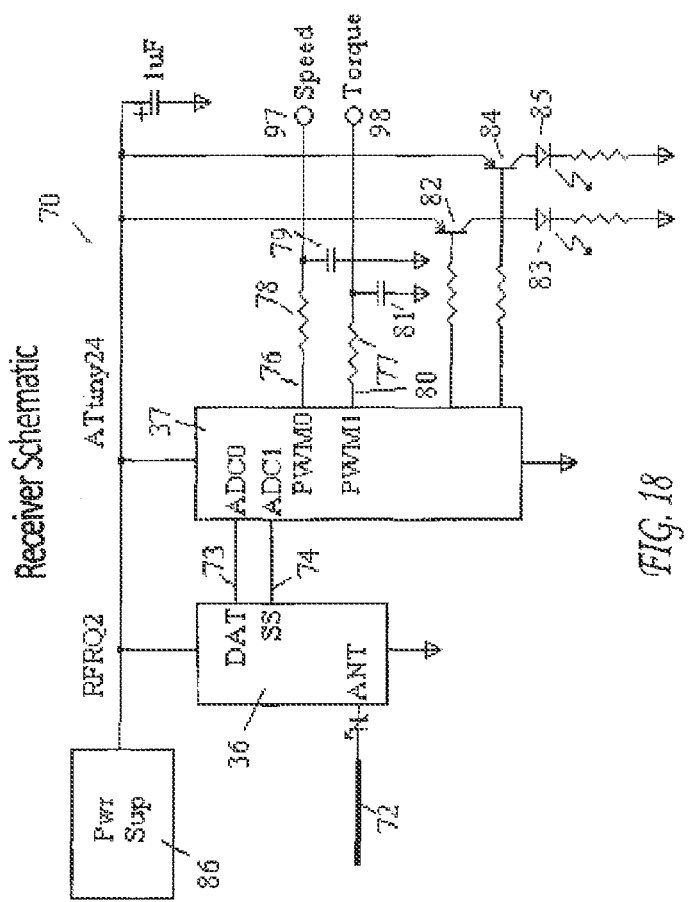
FIG. 18 shows a schematic diagram of an embodiment of a receiver.

FIG. 18 is a preferred embodiment of receiver 70. Power supply 86 supplies 5V to the components of the receiver. Receiver 36 receives signals from sender 55 on antenna 72 and converts the received signal to demodulated data on line 73, which enters microprocessor 37 for processing by software according to the preferred control algorithm. The received data is interpreted by the control algorithm which in turn generates signals significant of the preferred speed of the assist rope and preferred torque delivered by the motor 20.

In one embodiment, speed and torque signals may be developed according to a PWM method said that is executed on a microprocessor. In that case, the PWM signals on line 76 and 77 may be respectively converted to substantially steady signals on lines 97, 98 by low pass networks 78, 79 and 77, 81 respectively.

Other methods of generating speed and torque signals may also be employed, for example using a digital to analog converter to provide signals 97 and 98. Of course if a received signal was already in analog form, an appropriate scaling algorithm may be employed to provide signals 97 and 98.

Figure 19:
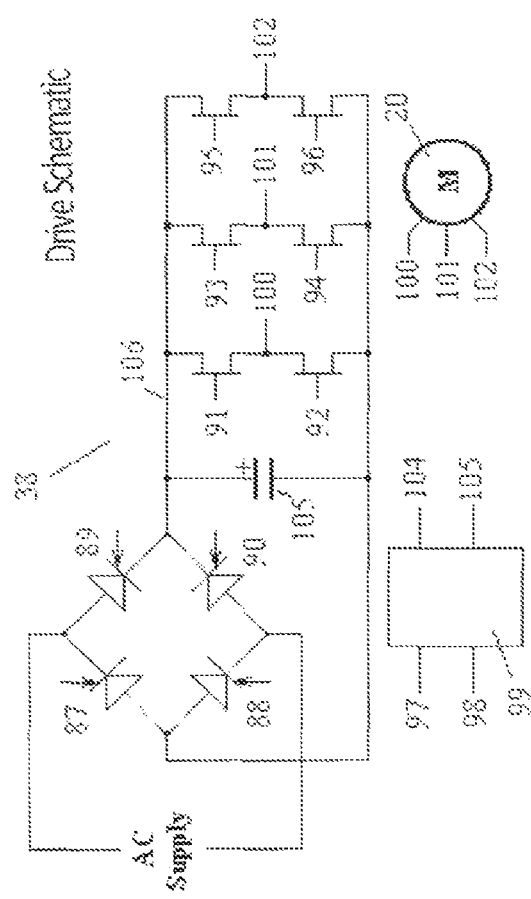
FIG. 19 shows a reference schematic of a typical drive for motor control.

With reference to FIG. 19 and by way of example of one several possible implementations to control motor 20, drive controller 99 would develop signals 104 and signals 105 from signals on lines 97 and 98 to control the voltage and frequency respectively of the supply to motor 20. For example, timing of signals 104 would be set to trigger the SCRs 87, 88, 89, 90 to develop the desired mean dc voltage at capacitor 105 on line 106. To operate the motor the power switch devices 91, 92, 93, 94, 95, 96 would be switched by signals 105 in a sequence to provide the correctly phased supply to said motor on lines 100, 101, 102. This schematic is diagrammatic only and other configurations are possible, for example, signals 104 and 105 may be multi-phased.

Of course, if the motor is of a different type such as a dc series motor, then the controller would be appropriate to the motor to provide the required speed and torque control. For example, as a considerable simplification, a single output such as 97 may be applied to a commercially available SCR drive to provide voltage control to a DC type motor thereby providing speed and torque control according to the desired algorithm for climber support.

When an initiating transmission from the sender is received, motor 20 will ramp up over a period such as 1 second to provide on initial torque and speed to provide a limited assist for example of 50 lbs with a corresponding climb rate determined by the climber.

In this embodiment of the invention, both climb assist load support and speed of the rope loop may be limited in the control algorithm. In addition, although it is not depicted in the figures, sheave 12 may be coupled to the system by a slipping clutch which would prevent excess climb assist load, for example, greater than 120 lbsf, from being applied to the rope loop. In the event of the load being applied that exceeds the rated value for the clutch, sheave rotational speed would differ from the input drive to the clutch and thereby limit delivery of assist.

Of course a maximum value of assist may also be set by selecting a motor with a specified maximum deliverable torque. Alternatively current limiting in the drive may be employed to limit applied assist force.

As one feasible method to terminate assist to the rope loop, for example when the climber wants to stop the system, the climber sags back against the assist direction for a specified minimum time, thereby exerting a load greater than a specified maximum load. When the control algorithm senses a load that exceeds the specified maximum load for a specified time, for example 3 seconds, then assist will be removed from the rope loop and braking will be provided to limit further rotation. Optionally, the climber operates a control on the sender to terminate assist.

FIG. 20 is a flowchart illustrating a preferred embodiment of the sender algorithm. The function of sender 55 is to transmit information to receiver 70 representative of activity of the climber and status of sender 55.

When the sender is activated by the climber, the sender is powered on at 201 by, for example, the application of a load causing switch 41 to close. Microprocessor 31 is then initialized at 202 and an internal clock is started at 203. The clock is configured to generate a clock tick at a specified interval, preferably but not necessarily 5 per second. Of course other intervals may be selected. At 204, a Start command is sent to the receiver to initiate assist, then at 205 the routine Send 208 is called which provides data to the receiver about the status of load and sender settings. Once the routine completes, the microprocessor enters a low powered Sleep condition at 206 where power consumption is minimized until the next clock tick occurs at 207. At every instance of a tick, the subroutine Send is called after which Sleep mode is re-entered at 206.

When subroutine 208 is called, the status of any operator controls 51, 60 are sent at 209, for example, but not necessarily an indication of up or down direction climber desires to move. Alternative means of commanding desired direction may be employed such as a multiple tug on lanyard to cause sensor to interpret this as a down direction command, whereas a single tug would be interpreted as an up direction command.

HED is enabled at 210 via transistor 47, the signal representative of load exerted by the climber from HED is read at 211 by microprocessor and HED is disabled at 212 to conserve power. A message representing measured load is sent at 213.

At 214 the value of the measured load is assessed, and if it exceeds a specified value LStop, then a stop message is sent at 215 to the receiver to terminate assist drive. Such an event may be caused by as the climber deliberately sags back against assist rope to stop assist.

If battery condition is measured as low at 214a, a low battery warning message is sent at 215 and the LED 56 is turned on at 210 to warn the climber of low battery status. Or course said LED draws extra power, so it may be operated in a pulsed manner to minimize extra power consumption.

The described cycle repeats at every tick. At each cycle, additional power is drained from the energy storage device 45, and particularly as current consumption during each transmission is relatively high. While the foregoing description included multiple instances of transmission at 204, 209, 213 and 215, a compilation of each category of message into a single transmitted packet may provide a significant reduction in power requirement.

If an immediate stop is required and further operation of the assist system is to be prevented, a switch correspondingly given the function Stop may be configured to cause an interrupt at 219a and immediate transmission of the Stop command 218a is made. To improved assurance of the command being enacted, sender may optionally transmit Stop command multiple times.

To extend availability of power it is advantageous to provide a means of augmenting available energy such as previously described.

Figure 21:
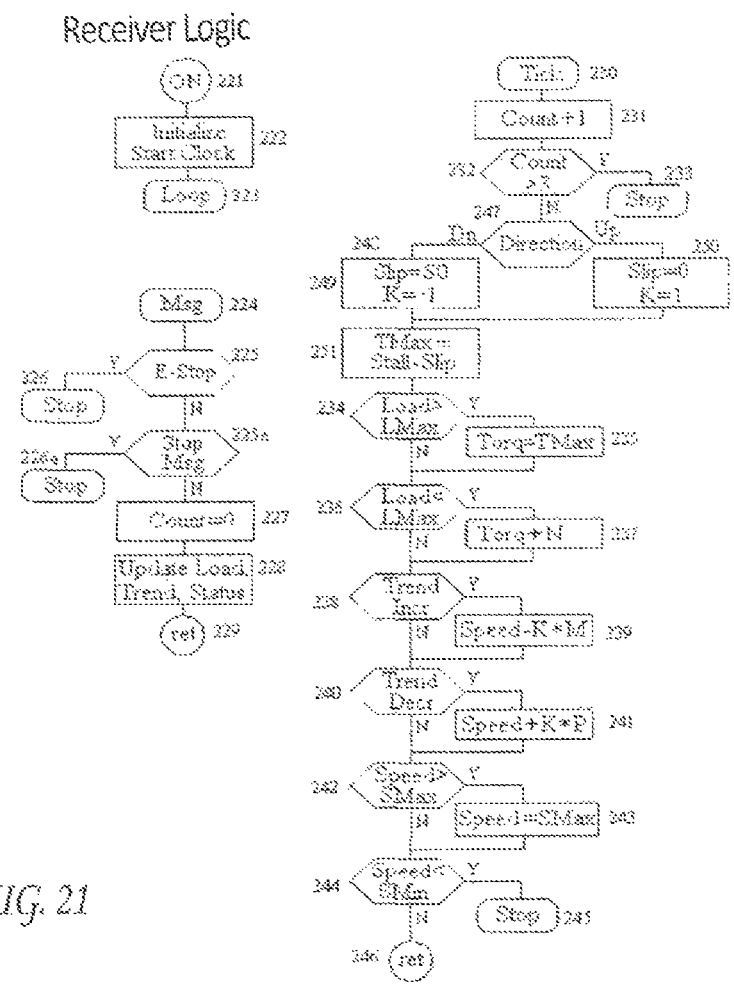
FIG. 21 is a flowchart illustrating an embodiment of a receiver algorithm.

FIG. 21 is a flowchart illustrating a preferred embodiment of the receiver algorithm. The function of the receiver 70 is to receive messages and commands from sender 55 and control motor 20 accordingly to provide the desired level of assist to the climber.

When power is applied to receiver at 221, microprocessor 37 is initialized at 222 and a clock is started. Clock is configured to generate a clock tick at a specified interval, preferably but not necessarily every one second. Of course other intervals may be selected. The program then waits for an event to occur in a loop at 223.

During initialization, key parameters may be set such as the starting speed and/or torque for assist. Such minimum values are set such that the climber is not subject to sudden jerks or excessive force or an assist speed which could cause distress and risk of injury to the climber.

Preferably, but not necessarily, interrupts are used to initiate responses to tick events, and to receipt of a message from said sender. Other events such as operator coated actions at the drive system or from controls where provided may also cause actions. In an interrupt driven system and as described herein, an interrupt will act to cause a specified service routine to enact and complete. Thereafter, operation returns to the function operating at the moment of the interrupt. In described embodiment, it is most likely that interrupts will occur while the receiver is executing the wait loop 223.

On receipt of a message, the segment at 224 is entered from the loop. If the message contains a stop command, the drive system is stopped and assist is removed.

Although the distinction between an immediate stop message at and a stop command message, it may be preferable that an immediate stop will disable all further operation until power to the receiver is recycled off-on, or souse other intervention action is made, whereas a stop command will stop the assist drive with further enablement being possible by normal command from sender.

Once a message is received at 224 that is not of the stop class, the value Count is reset to zero to prevent premature cessation of assist, and the records of data contained in the message such as load, load trend computed from a history of load samples and switch settings is updated at 228, and the routine is exited.

On generation of tick, the routine at 230 is initiated and a counter is incremented at 231. The purpose of the counter is to provide a timer to time out and terminate assist if no further messages are received from said sender. At 232 the count is checked and if it exceeds a limit value for example but not necessarily 3, then the drive system is stopped and assist is removed. A variety of subsequent control actions may be defined, including re-enabling assist by re-starting said drive system based on commands from the climber. Alternatively the power to the drive system may be recycled to re-initialize the system for normal resumption of operation.

If count has not reached the limit value then parameters K and Slip are set at 248 and 250 based on the sensed direction of assist at 247 required by the climber, and the value TMax is set at 249. Specifically, K determines the direction of modification of torque and speed for assist and Slip sets the degree to which the motor drive tray may be allowed to run forwards or backwards according to the climber direction being up or down. When loaded to a specified amount, the torque limit of the motor, TMax, will determine motor slip which is defined as the deviation between the no-load and loaded speed. Consequently TMax is set at 251 or another value in the range such as 0 to 255

At 234 the value of the measured load is compared with a specified value stated as LMax, for example but not necessarily 120 lbs, and if greater than LMax then the drive system torque TMax is set to the maximum value at 235.

At 236 the value of the measured load is compared with said specified value stated as LMax, and if less than LMax then the drive system torque is changed by a factor K*N at 237. Factor N may be chosen as for example but not necessarily 10% of the maximum specified value of LMax. Consequently said assist torque may be progressively changed in steps towards the desired maximum value LMax without feeling jerky to the climber. Note that K is +1 or −1 accordingly as the direction is up or down.

Of course if the climber sags back against the assist in the up direction and load exceeds said value LStop then assist will be terminated as previously described. In the down direction assist will stop after a delay once load on the sensor is removed or communications ceases, and additionally once said rope grab is unloaded it may be designed to no longer have frictional attachment to said assist rope as is a characteristic of commercially available rope grabs, so will cease support to the climber.

An 238 the value of the trend of the load is assessed, and if it is increasing for the up direction, it implies that the climber may be tired and unable to keep up with the level of assist being provided, consequently the speed of assist may be decreased by a factor M (K−1) at 239. In the down direction an increase in load trend implies that the climber may want to descend faster, so speed is increased by the factor M (K−1).

Factor M may be chosen as for example but not necessarily 10% of the maximum at specified value of speed. Consequently said assist speed may be progressively decremented towards a desired minimum value without feeling jerky to the climber. Note that the minimum value may also include zero speed and that K is +1 or −1, accordingly, as the direction is up or down.

At 240 the value of the trend of the load is assessed, and if is decreasing for the up direction, it implies that the climber may be moving faster than assist is providing support. Consequently the speed of assist may be increased by a factor P at 241. In the down direction an increase in load implies that the climber wants to descend faster, so speed is decreased by the Factor M (K−1) to allow higher slip.

Factor P may be chosen as for example but not necessarily 10% of the maximum specified value of speed. Consequently the assist speed may be progressively incremented towards a desired maximum value SMax without fueling "jerky" to the climber.

At 242 the value of assist speed is assessed and if it exceeds a specified maximum value SMax then speed is set to SMax at 243.

At 244 the valve of the speed is assessed and if less than a specified minimum value SMin, for example but not necessarily 5 ft/min, then assist will be terminated as previously described.

Following completion of Tick processing the receiver returns at 246 to continue the wait loop at 223 until a next event occurs.

In the above, it is understood that the maximum value of torque TMax is for example but not necessarily such as to deliver 120 lbsf to the climber. Also the maximum speed SMax is such that the speed of the assist rope 4 is for example but not necessarily 100 ft/min.

Additionally it is understood that there may be several classes of stop condition defined where differing actions result such as:

an immediate condition where the drive system is completely disable from further assist, for example at 219a; and, a normal stop condition, for example where the climber sags back against said assist rope. In this condition the system may be restarted upon climber command, for example at 214; and, where the assist speed is less than a specified minimum value, for example at 244. In this condition the system may be restarted upon climber command.

A further refinement to the algorithm in microprocessor 37 for control of assist delivered to the climber, is to use the well-known relationship between power (P), torque (T), and rotational speed (R) for a motor: P=kTR where k is a constant. In the above description of control using torque and speed where speed of the motor has a direct relationship to assist rope speed, then where one parameter is adjusted to suit a climber's need, then the other parameter would also be set to keep the equation P=kTR balanced. Of course other relationships between load and delivered power may be specified, preferably to maximize the climber's perception of value or delivered assist.

For example if Power P was a parameter selectable by the climber (possibly as a function of climber weight) as speed (R) was varied, then torque T would be adjusted using T=P/(kR). Similarly as torque varies, than speed R is adjusted using R=P/(kT).

Also it may be desired to provide further simplification of the system by varying only one parameter such as speed or torque, keeping the other parameter constant, however it is expected that a more satisfactory assist system would be experienced by the climber by keeping the selected power level constant. Such control may be exemplified where a DC motor is used, control being applied from applied voltage as previously disclosed.

Further, as a climber's load, as sensed the sensor, is not constant as the climber moves from ladder rung to rung, additional signal processing may be required to compensate for these climber induced cyclic variations in load and use filtered values of the measured signal representing load. In doing so, it may be expected that using a sampling rate, as preferred above, of one second may not be adequate. Correspondingly, the system may be set to a different sampling rate, optionally dynamically selected by further signal processing to provide an optimal representation of the climber's load.

As further refinement in operation, it may be advantageous to include time delays to prevent undesirable changes in assist, for example when a small change is sensed in load or load rate, then a longer time delay, for example but not necessarily 1 seconds, may be imposed before changing assist, whereas if a large change occurs, then a shorter delay, for example but not necessarily 1 second, in changing assist may be utilized. Other time delays may be applied to starting and stopping assist according to the status of the system, for example an immediate stop should be immediate, whereas a normal stop may take longer, for example by ramping down the speed to zero, for example but not necessarily 1 second. Similarly when assist is started it may be desirable to ramp to the desired speed to prevent a jerk start, similarly for stop condition. Note that soft-start and soft-stop are well known for motor control.

Of course, it is also possible to provide any desired level of processing as an algorithm operating in the sender microprocessor 31, including managing the relationship between power, torque and speed for transmission to the receiver for motor control; however to minimize power consumed by the sender, it is reasonable to expect that minimizing said sender processing requirements will reduce power consumption.

Figure 22:
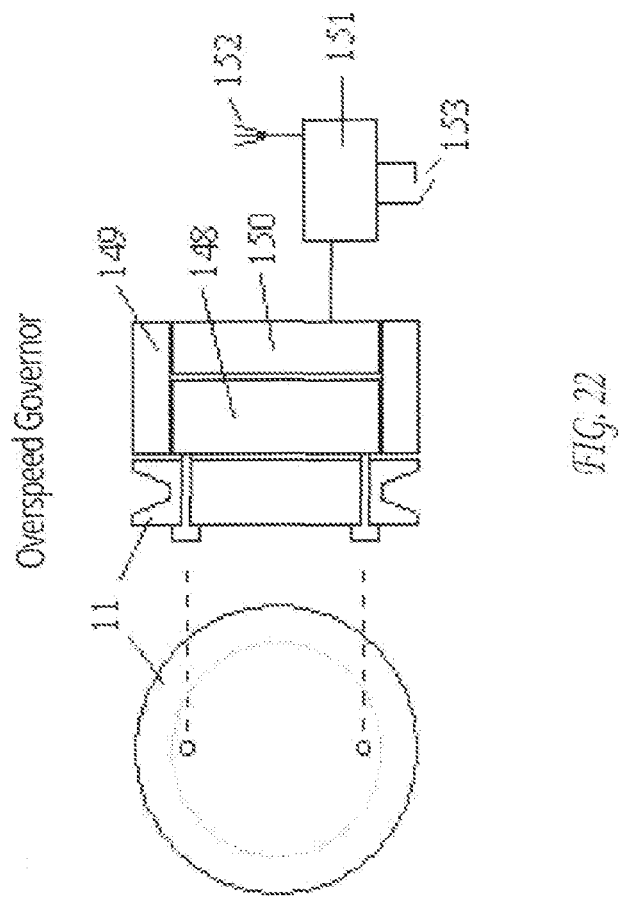
FIG. 22 shows a diagrammatic embodiment of an overspeed governor.

FIG. 22 shows a diagrammatic embodiment of an overspeed governor according to the invention. To prevent an overspeed condition causing a hazard to the climber in the event of a fault causing assist speed to increase beyond a safe value, an overspeed governor may be disposed in relation to either of the sheaves to terminate or limit assist, or as a function of a sheave in any position in the system.

For example FIG. 22 shows the top sheave 11 associated with a proportional governor where above a threshold speed of rotation of the sheave such as a climb speed of 100 ft/min, clutch 148 engages a brake 149 to progressively load or stall the drive system and limit the available drive from said motor. Where the brake acts to progressively load the drive system, an ultimate maximum speed may be set, for example but not necessarily 120 ft/min.

Further drive may be inhibited until the assist system is reset, for example by running the sheave in the opposite direction momentarily.

As a further facility, said governor may include a power generator 150 to power communication from an associated sender 151 via antenna 152 to said receiver elsewhere in the event that an overspeed or any other fault condition is detected. It may also include a switch 153 so that a rescue mode can be initiated from the top location to avoid the need to descend first to set the desired mode. In a rescue mode it may be useful to include a facility where unpowered descent at a controlled speed relatively independent of load is provided. Using a motor in regenerative mode will provide such capability, for example as disclosed by hoists systems manufactured and sold by Power Climber, a subsidiary of SafeWorks, LLC.

As a yet further embodiment of a system for control of an assist system based on sensing of load of a climber to control power delivered to assist the climber, load could be sensed at either sheave with an appropriate load measuring apparatus. However this is considered obvious and does not convey the advantages of the direct sensing method as described in this disclosure so has not been considered further.

It is understood that the term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s). Additionally, computer executable instructions embodying aspects of the invention may be stored in ROM EEPROM, hard disk (not shown), RAM, removable magnetic disk, optical disk, and/or a cache of processing unit. A number of program modules may be stored on the hard disk, magnetic disk, optical disk, ROM, EEPROM or RAM, including an operating system, one or more application programs, other program modules and program data.

What is claimed is:

1. A system configured to lift or lower a carriage device via a ladder climbing structure, comprising:
    a rigging movable in a substantially vertical direction;
    a carriage device configured to enclose and transport a payload and adapted to be lifted and lowered along at least one rail of the ladder climbing structure;
    an apparatus coupled to the rigging and adapted to translate rigging movement into an ascent or descent of the carriage device;
    a receiver operable to receive signals indicative of a change in state of the carriage device;
    a control mechanism coupled to a power source and communicatively coupled with the receiver to control power delivery to the rigging based on a detected change in state of the carriage device, and
    an input mechanism operable to receive a signal indicating whether the system is operating in a tool lifting mode or a personnel assist mode, wherein the system is configured to prevent operation to lift a person when the signal indicates that the system is operating in the tool lifting mode.

2. The system of claim 1, further comprising a belt grab mounted to the carriage device and adapted to be mechanically coupled to the rigging for ascent and descent along the ladder climbing structure.

3. The system of claim 1, further comprising a sensor configured to detect changes in position of the carriage device.

4. The system of claim 1, further comprising a fall arrest grab with an overspeed brake coupled to the rigging, the fall arrest grab configured to brake an uncontrolled descent of the carriage device.

5. The system of claim 1, further comprising a weight sensor communicatively coupled to the control mechanism, the weight sensor configured to detect a payload weight of the carriage device.

6. The system of claim 1, further comprising one or more obstruction sensors mounted to the carriage device and communicatively coupled to the control mechanism and configured to detect an obstruction along a path of the carriage device.

7. The system of claim 1, wherein the apparatus comprises a motor configured to generate rotational torque, a power supply coupled to the motor, a drive sheave assembly mechanically coupled to the motor, and a mounting apparatus coupled to the drive sheave assembly and motor and rigidly affixed to the ladder climbing structure.

8. The system of claim 1, further comprising an audio sounder configured to alert persons of the carriage device's location and status.

9. A system configured to lift or lower a load via a ladder climbing structure, comprising:
- a rigging movable in a substantially vertical direction;
- an apparatus coupled to the rigging, said apparatus adapted to translate rigging movement into an ascent or descent of the load;
- a sensor operable to detect a change in state of the load;
- an input mechanism operable to receive a signal indicating whether the load is a person or a carriage device, wherein the system is configured to prevent operation to lift a person when the signal indicates that the load is a carriage device; and
- a control mechanism coupled to a power source and in electrical communication with the sensor to control power delivery to the rigging based on a detected change in state of the load and on said signal, wherein the carriage device is configured to be lifted and lowered along at least one rail of the ladder climbing structure.

10. The system of claim 9, wherein the carriage device is adapted to enclose and transport a payload and includes an opening in at least an outside portion of the carriage device, the opening having a removable cover to access the inside portion of the carriage device.

11. The system of claim 9, wherein the carriage device is further adapted to sense obstruction in its movement along the ladder climbing structure and change its operational state in response thereto.

12. The system of claim 11, further comprising a belt grab mounted to the carriage device and adapted to be mechanically coupled to a rigging for ascent and descent along the ladder climbing structure.

13. The system of claim 9, further comprising a sensor communicatively coupled to a control mechanism and configured to detect a payload weight of the carriage device.

14. The system of claim 9, further comprising a sensor configured to detect changes in position of the carriage device.

15. The system of claim 9, further comprising a fall arrest grab with an overspeed brake coupled to the rigging, the fall arrest grab configured to brake an uncontrolled descent of the carriage device.

16. The system of claim 9, further comprising a weight sensor communicatively coupled to the control mechanism, the weight sensor configured to detect a payload weight of the carriage device.

17. The system of claim 9, further comprising one or more obstruction sensors mounted to the carriage device and communicatively coupled to the control mechanism and configured to detect an obstruction along a path of the carriage device.

18. The system of claim 9, further comprising a motor configured to generate rotational torque, a power supply coupled to the motor, a drive sheave assembly mechanically coupled to the motor, and a mounting apparatus coupled to the drive sheave assembly and motor and rigidly affixed to the ladder climbing structure.

19. The system of claim 9, further comprising an audio sounder configured to alert persons of the carriage device's location and status.

* * * * *